July 27, 1943.  M. L. BREWSTER  2,325,223
PNEUMATIC CUSHION
Filed Feb. 18, 1939  3 Sheets-Sheet 1

Inventor.
Marshall L. Brewster.

Attorney.

July 27, 1943.  M. L. BREWSTER  2,325,223
PNEUMATIC CUSHION
Filed Feb. 18, 1939  3 Sheets-Sheet 2
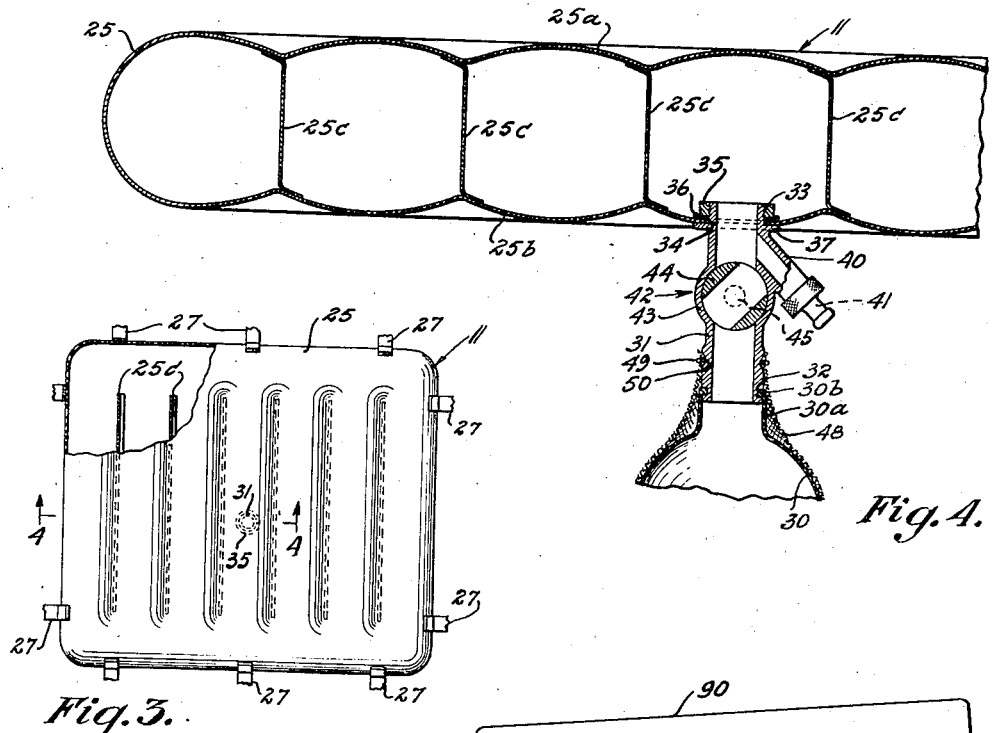
Fig.3.
Fig.4.
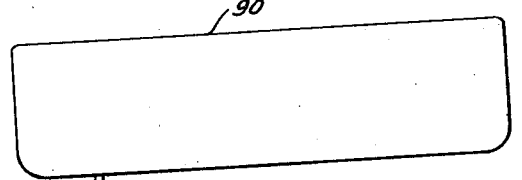
Fig.7.
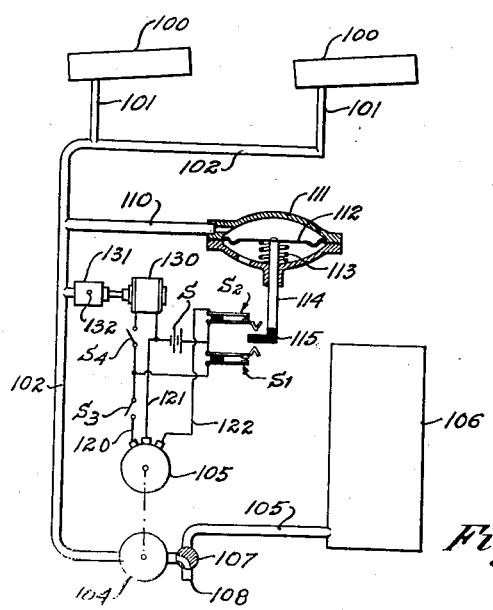
Fig.8.
Inventor.
Marshall L. Brewster.
Attorney.

July 27, 1943.  M. L. BREWSTER  2,325,223
PNEUMATIC CUSHION
Filed Feb. 18, 1939  3 Sheets-Sheet 3

Inventor:
Marshall L. Brewster.

Attorney.

Patented July 27, 1943

2,325,223

UNITED STATES PATENT OFFICE 2,325,223

PNEUMATIC CUSHION

Marshall L. Brewster, Van Nuys, Calif.

Application February 18, 1939, Serial No. 257,217

9 Claims. (Cl. 155—179)

This invention relates generally to pneumatic cushions, and in its primary aspect is directed particularly to the provision of a pneumatic cushion adapted for use in aircraft and equipped with means for automatically compensating the tendency of such a cushion to become unduly distended and "hard" with increasing altitude due to lowered external air pressure. However, while the present invention is chiefly directed to such use, it is not necessarily limited thereto, since it involves features of advantage in point of increased riding comfort when employed in land vehicles such as automobiles.

In aircraft service it is of course of the highest importance that the weight of all members be reduced to the barest minimum consistent with structural strength and the function to be fulfilled. The weight of a transport plane may be materially reduced by the use of pneumatic cushions. An ordinary pneumatic cushion, however, is not well adapted to aircraft service, as will be apparent from the following considerations. If an ordinary air cushion be inflated to a degree giving comfortable softness at sea level, the internal pressure will exceed the external or atmospheric pressure by a degree which may be referred to as the normal pressure differential necessary to preserve or to give proper "softness." As the plane ascends, the external pressure falls, thus increasing this differential, and the cushion correspondingly distends or becomes relatively "hard." At high altitudes the distension is sufficient to make the cushion very hard and uncomfortable.

It is accordingly a primary object of the present invention to provide a pneumatic cushion for use in aircraft, or other vehicles which encounter differences in altitude, which will maintain the differential of internal and external pressures approximately equal to a predetermined normal value for proper comfort throughout the range of barometric pressure conditions encountered in aircraft service.

A further object of the invention is to provide an extremely light seat which is comfortable under all conditions incident to aircraft service.

A still further object of the invention is to provide an extremely comfortable pneumatic cushion having improved shock absorbing characteristics.

In accordance with the present invention, there is provided a light frame work equipped with air or gas-filled cushions. In a specific illustrative form of the invention, each of these cushions has an expansive compensating chamber communicating with its interior. In a present preferred form, this chamber embodies an elastic sack or balloon, typically formed of rubber. Under sea-level external pressure conditions, this compensating chamber remains substantially in a contracted, equilibrium condition, even when the cushion is loaded by the weight of the passenger. However, as the plane ascends and the external pressure falls, the differential of internal and external pressures exceeds a predetermined maximum limit, at which time the compensating chamber expands and thereby increases the total volumetric capacity of the cushion and chamber. This drops the internal pressure sufficiently to restore, or preserve, the "normal differential," and hence the desired degree of softness. The yielding restraint to expansion imposed by the elastic compensating chamber walls limits expansion at all times to that required to preserve, approximately, or within sufficiently close limits, the predetermined normal pressure differential. It will be apparent that as the plane descends, and external pressure increases, the compensator acts, in effect, to decrease the volumetric capacity of the cushion, thus raising the internal pressure and maintaining the normal differential.

Various additional features of the invention will appear and be explained in the course of the following description of typical illustrative embodiments thereof. Reference will be directed to the accompanying drawings, in which:

Fig. 3 is a plan view, with parts broken away, of one illustrative form of cushion in accordance with the present invention, being the bottom cushion of the seat of Figs. 1 and 2;

Figure 4 is a section taken as indicated by line 4—4 of Fig. 3;

Fig. 7 shows a modified form of compensator; and

Fig. 8 is a schematic diagram showing further modifications.

Figure 1:
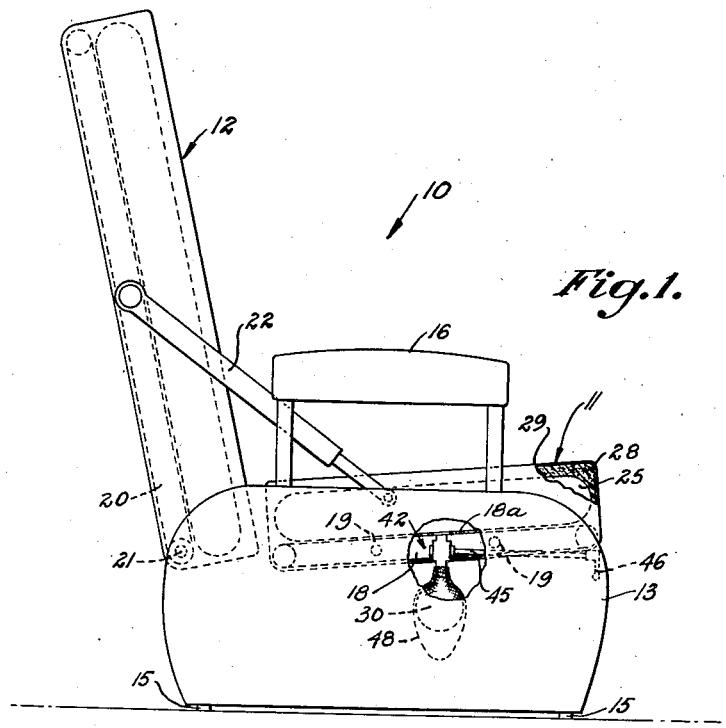
Fig. 1 is a side elevation of an aircraft seat embodying the present invention.
Figure 2:
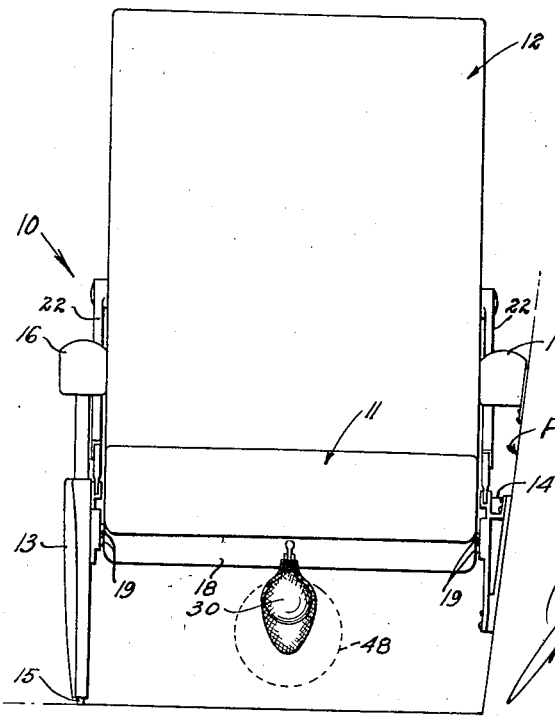
Fig. 2 is a front elevation of the seat shown in Fig. 1.

In the drawings numeral 10 designates generally an airplane seat, comprising padded seat cushion 11, padded back cushion 12, a side frame 13 at one side of the seat and a supporting bracket 14 secured to the plane structure P at the other side of the seat. Side frame 13 has legs 15 and is equipped with arm rest 16, while the arm rest 17 for the other side of the seat is shown as secured to the plane structure. Padded seat cushion 11 is shown as provided with a light tubular framework 18, provided with laterally projecting studs 19 supported by side frame 13 and bracket 14. Padded cushion 12 is likewise provided with a light tubular framework 20, the lower portion of which is pivotally mounted, as indicated at 21, between side frame 13 and bracket 14. The back cushion is braced by means of members 22 connected at their upper ends to the sides of tubular framework 20, at points about midway of the height thereof, and at their lower ends to side frame 13 and supporting bracket 14, in the manner clearly indicated in Figs. 1 and 2.

The structure as so far described is more or less typical of a conventional airplane seat, and forms no part of the present invention. The present invention is concerned with the make-up and appurtenances of cushions 11 and 12, as now to be described.

In the illustrative form of Figs. 1 to 4, padded cushion 11 includes an internal pneumatic cushion 25, which is the cushion proper, or may be regarded as a bladder, the aforementioned tubular frame 18, and a light perforated plate 18a carried by frame 18, and on which cushion 25 is supported, the cushion being equipped with straps 27 anchored to frame 18. The cushion, as here illustratively shown, also includes padding 28 of some suitable light material such as kapok, and exterior upholstery 29, the latter surrounding framework 18 as well as cushion 25 and padding 28. The detailed construction of the supporting arrangements for the cushion is similar to that employed in connection with back cushion 12, illustrated in detail in Fig. 6, and will be better understood following explanation of Fig. 6.

Internal cushion 25 is formed of some suitable gas-holding material, preferably substantially non-stretching, such as rubber-treated balloon silk. While this cushion is here illustrated as provided with exterior padding and upholstery, it is to be understood that this may not in all uses be essential, and is therefore not to be regarded as limitative on the invention. When cushion 25 is confined, as between padding 28 and upholstery 29 on one side and supporting plate 18a on the other, further provisions for limiting and confining its size and shape may not be required. However, to assure substantial maintenance of proper size and shape of the cushion under all conditions, the upper and lower opposed walls 25a and 25b thereof are tied together by parallel webs 25c. Some such shape-confining provisions are of course desirable in any instance in which the cushion 25 is used without external casing.

Cushion 25 forms a part of a gas-holding enclosure or system, which includes one wall adapted to receive a load (cushion wall 25a), and another wall which is movable, against yielding restraint, preferably elastic, to vary the volumetric capacity of the enclosure. While this last mentioned wall may be any wall of the gas-enclosure, and may be a wall of the cushion itself, other than the load receiving wall, it is preferably a wall defining an expansive compensating chamber that is separate of, but in communication with, pneumatic cushion 25. In the illustrative embodiment of my invention shown in Figs. 1 and 4, this compensating chamber comprises an elastic sack or balloon 30, typically and preferably formed of rubber.

Sack 30 communicates with the interior of cushion 25 by way of tube 31, having a neck portion 30a adapted to fit over one end of tube 31 and being formed with a bead 30b adapted to be received and secured in an air-tight manner, as by cementing, within an annular groove 32 formed around the end portion of tube 31. The other end of tube 31, which is externally threaded as at 33, projects inside cushion 25 through an opening 34 formed in its lower wall 25b, and a nut 35 and washer 36 cooperate with a flange 37 formed on the tube to effect a gas-tight fit between the tube and cushion, in the manner clearly illustrated in Fig. 4. The cushion is inflated by way of a tubular projection 40 extending from tube 31 and provided at its end with a suitable air valve, indicated at 41.

As here shown, a means is provided for adjusting the cross sectional area of the air passage between cushion 25 and bag 30, this means being illustrated in the form of a valve 42 positioned in tube 31 between the cushion and compensating chamber. Thus tube 31 is formed with a valve body 43 in which is fitted a rotatable valve 44 operable by means of stem 45 and handle 46 (see Fig. 1). The purpose of this valve will be described at a later point in the specification.

Surrounding sack 30 is an expansion limiting wall in the form of a flexible bag 48, the latter being fitted over the end of tube 31 and secured thereto by clamping means 49 cooperating with annular groove 50. Clamping means 49 may be, for example, a tight cord, or a contractible clamping ring. Expansion-limiting bag 48 may be made up of any suitable flexible material, such as cord mesh. This bag 48 should be of flexible material, since engagement of the distended rubber sack 30 with any rigid member might result in rupturing it.

The operation of the system as described is as follows: The gas enclosure comprising pneumatic cushion 25 and compensating chamber or sack 30 is first gas-inflated to a degree giving comfortable softness at sea level. The gas used will ordinarily be air, though of course a lighter than air gas such as helium may be used with added advantage. The internal cushion pressure will be greater than atmospheric, and the difference between internal and external pressures existing under such conditions, assuming the cushion to be loaded with the weight of an average passenger, may be expressed as the normal pressure differential for appropriate softness. Preferably, the cushion is initially inflated to a degree sufficient to expand but not substantially stretch, the elastic compensating sack 30. The pressure internally of the cushion will then exceed external pressure by a slight degree. Sack 30 is so fabricated as to have sufficient inherent resistance to expansion that it will then be only slightly distended, or stretched, if at all, when the weight of a passenger is imposed on the cushion. The pressure due to loading is approximately one or two pounds per square inch.

Now as the plane ascends, the external pressure falls with relation to the internal pressure, thus increasing the pressure differential. As this occurs, the pressure differential finally reaches a predetermined value at which the inherent resistance to expansion of sack 30 is overcome; the sack accordingly expands slightly and increases the volumetric capacity of the gas-holding enclosure. This expansion is sufficient to restore, or preserve, approximately, the "normal pressure differential," and hence the required degree of cushion softness. With the use of a compensating chamber having elastic or resilient properties, as a rubber sack in the nature of a balloon, the tendency to expansion owing to increased pressure differential is of course opposed by elasticity inherent in the walls of the chamber, and it will be apparent that the resistance to expansion will become increasingly greater as the chamber expands. This of course means that the volumetric capacity of the gas-holding enclosure does not increase linearly with decreasing external pressure; nevertheless, the increase in volumetric capacity keeps pace with decreasing external pressure with comparative closeness, and the normal pressure differential established at sea level may for all practical purposes be regarded as approximately preserved, i. e., confined within limits which are sufficiently close for the purpose, for all normal flight conditions.

The expansion limiting external bag 48 limits expansion of rubber sack 30 against becoming distended under any conditions to such an extent as would be apt to cause it to rupture. Bag 48 is of course of such size that it is not completely filled by sack 30, under normal operating conditions, until especially high altitudes are reached.

When the plane subsequently descends, the external pressure increases, and chamber or sack 30 contracts accordingly, thereby reducing the volumetric capacity of the cushion and compensating chamber, and thus raising the internal pressure and maintaining the normal pressure differential.

Valve 42 is adjusted to restrict somewhat the air passage between cushion 25 and compensating chamber 30. The size of this passageway is large enough so that when the weight of the passenger is suddenly imposed on the cushion, either in initially sitting down, or in case of shock either due "rough" air or in landing, the air will flow freely from cushion to compensating chamber, the latter of course expanding. The restriction of the passageway is such, however, that as the elastic chamber subsequently contracts, the back flow of air, from elastic chamber to cushion, will be somewhat checked, so that sudden rebound is avoided. This effect is due simply to the fact that, with a restricted passageway between cushion and compensating chamber, the air will be forced with considerable velocity from cushion toward chamber under the pressure conditions existing when the load of the passenger is suddenly thrown on the cushion, whereas the back flow of air occurs simply by reason of the much weaker pressure exerted by the stretched walls of the compensating chamber, and hence is at much reduced velocity, so that the rebound is checked. The seat thus has the characteristics of a pneudraulic shock absorber. This characteristic of the cushion renders it unusually comfortable, and because of the increased comfort provided, the cushion may be employed to advantage in land vehicles such as automobiles. In such service, no compensation for varying external pressure conditions is necessarily involved, but the shock absorbing functions of the cushion come especially into play. Of course, while I have here shown a separate, adjustable means in the form of valve 42 for adjusting the cross sectional area of the passageway between cushion 25 and the compensating chamber, it will be understood that, in cases in which adjustment may not be necessary, the connecting passageway may be formed of the proper, restricted cross sectional area and the adjustable valve omitted.

Figure 5:
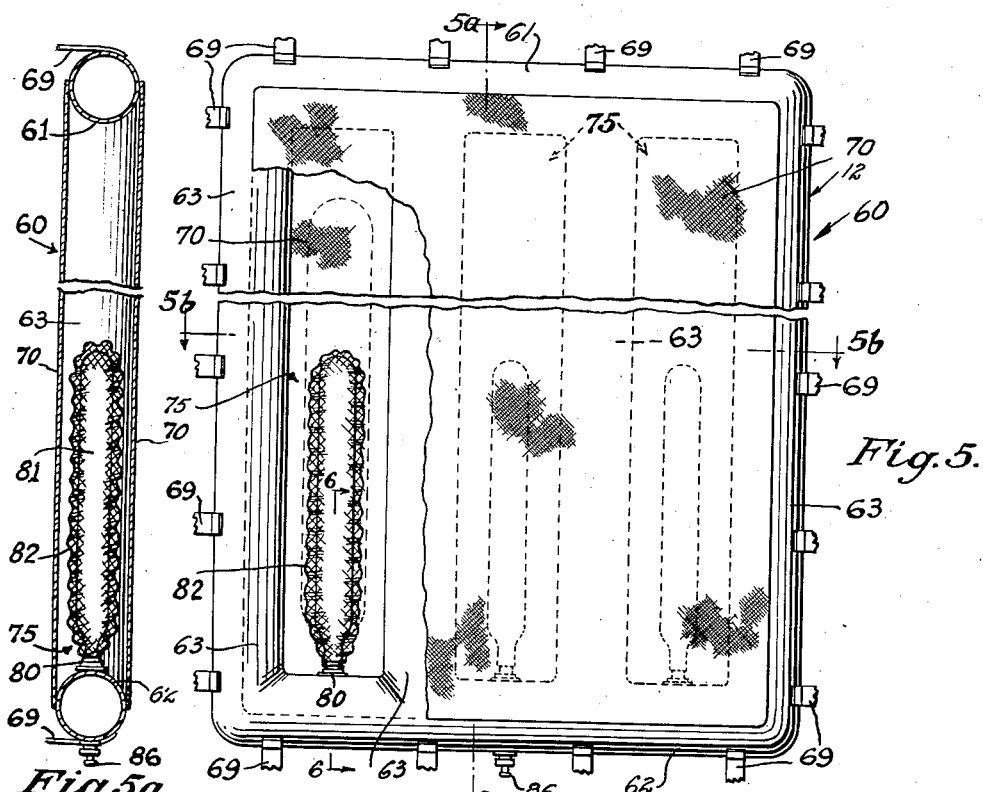
Fig. 5 is an elevation, with parts broken away, of a modified form of cushion in accordance with the present invention, being the back cushion of the seat of Figs. 1 and 2.
Figures 5A, 5B:
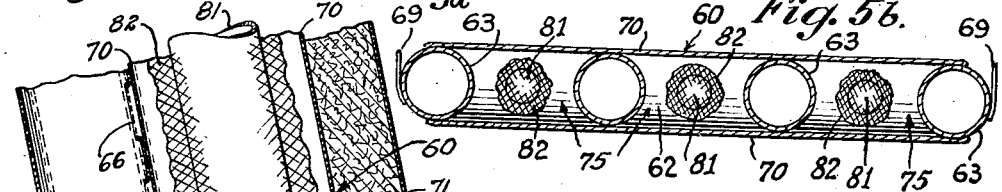
Fig. 5a is a section taken on line 5a—5a of Fig. 5.
Fig. 5b is a section taken on line 5b—5b of Fig. 5.
Figure 6:
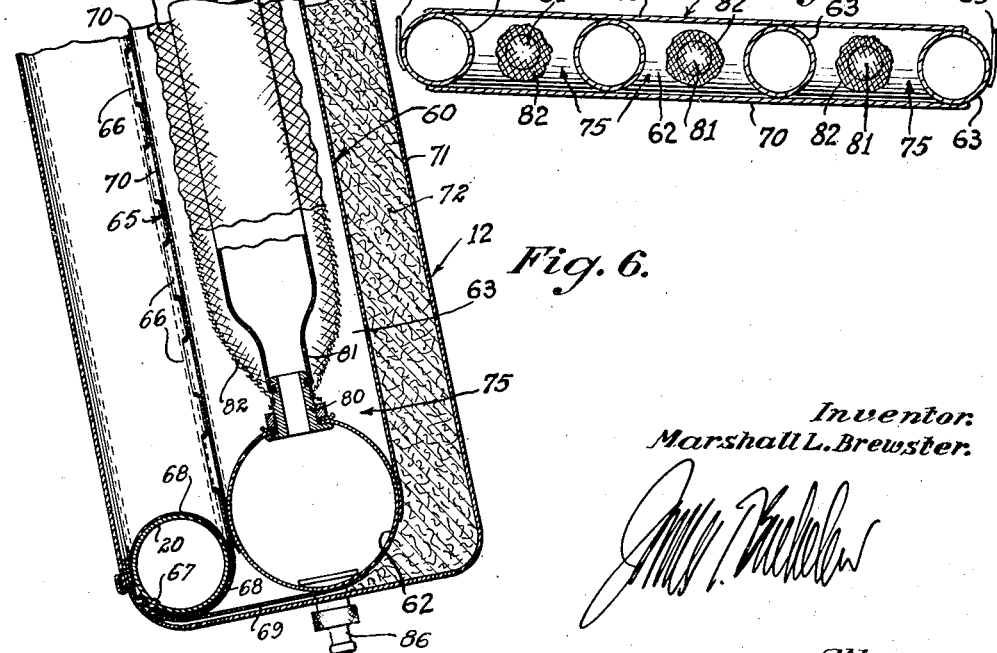
Fig. 6 is a section taken as indicated by line 6—6 on Fig. 5.

Figs. 1, 2, 5 and 6 show back cushion 12 to be made up with its internal pneumatic cushion 60 in a slightly modified form. In this instance the internal cushion is made up in grill form, comprising upper and lower horizontal members 61 and 62, respectively, and spaced parallel members 63 joining members 61 and 62, all of said members being of tubular cross section, as shown in Fig. 6. The preferred manner of support of cushion 60, which may also be employed in connection with previously described cushion 25, is shown in detail in Fig. 6. As there shown, cushion 60 rests against a metal plate 65, preferably perforated for lightness, as indicated at 66, supported by tubular frame work 20. In the particular construction illustrated, metal plate 65 is bent around tubular frame work 20 and fastened thereto as by screws 67. A fabric member 68 is placed between metal plate 65 and frame work 20, and wrapped around said frame work in the manner clearly illustrated in Fig. 6. Secured to this fabric member 68 are straps 69, which are cemented to cushion 60 and support the latter in position against plate 65.

Secured to opposite sides of cushion 60, as by cementing, are fabric sheets 70, preferably formed of balloon silk, which is left untreated so that it remains air-porous. Numeral 71 indicates the usual exterior upholstery, and numeral 72 the light packing between said upholstery and cushion 60. As illustrated, upholstery 71 entirely surrounds tubular frame work 20, as well as cushion 60 and padding 72.

The principal difference between the form of Figs. 5 and 6 and that of Figs. 3 and 4 is the provision in the grill form of Figs. 5 and 6 of the spaces 75 between vertical cushion sections 63, which spaces 75 are utilized to receive pressure compensating chambers. Thus, in the embodiment illustrated, lower cushion member 62 is provided, within each of spaces 75, with a fitting or nipple 80, over the end of which is fitted an elongated elastic compensating chamber or sack 81, which may again be regarded as typically composed of rubber, in the nature of a rubber balloon. Each of sacks 81 is provided with an expansion limiting bag or stocking 82, formed of some suitable flexible material such as cord mesh. This stocking is fitted over and made secure to nipple 80, for example as typically indicated in Fig. 6. Cushion 60 may be inflated through valve fitting 86 projecting downwardly from the lower side of cushion section 62 through upholstery 71.

The operation of the form of Figs. 5 and 6 is the same as that previously described in connection with Figs. 3 and 4. External air pressure conditions are transmitted through the external upholstery and through perforated plate 65 and porous sheet 70 to the cushion and to compensating chamber 81. The compensating chamber or sack, in expanding, increases in size from its normal contracted condition, illustrated in full lines in Figs. 5 and 6, to the fully expanded limiting position indicated in dotted lines. In so expanding, sack 81 moves upwardly in the form of an elongated balloon, lifting mesh bag 82 with it, and being finally limited against further expansion when it has reached the full diameter and length permitted by the dimensions of bag 82.

The form of Figs. 5 and 6 is of advantage in that the compensating chamber is entirely enclosed within the limits of the cushion itself, to obvious advantage.

In the forms of the invention shown in Figs. 1 through 6, the yielding restraint to expansion of the compensating chamber is supplied by the use of an elastic, distensible wall. Of course the necessary yielding restraint and opposition to expansion of the compensating chamber, or, more broadly considered, the increase in the volumetric capacity of the gas-holding enclosure or system, may be obtained in other ways, as by use of a movable wall restrained against outward movement by suitable yieldable opposing means such as weight or spring. Fig. 7 shows such a modification, in which the pneumatic cushion, indicated at 90, communicates by way of connection 91 with the head end of a cylinder 92, the latter being fitted with a movable wall 93 in the form of a piston, yieldingly restrained against outward movement by an elastic means in the form of a compression spring 95. This compression spring acts between the wall or piston 93 and a support or seat 96 formed on the end of a stud 97 screw-threaded within a spider 98 mounted within the open end of cylinder 92. The head end cylinder is shown equipped with a valve fitting 99, through which the cushion may be inflated. It will be evident that the form of Fig. 7 is the full equivalent of the previously described form of the invention involving a compensating chamber in the form of an elastic sack, the compensating chamber in the instance of Fig. 7 constituting the space S defined by the head of cylinder 92 and the movable wall or piston 93, the latter corresponding, of course, to the distensible wall of sack 30 in the form of Fig. 4. The operation of the form of Fig. 7 is essentially the same as that of the previously described forms of the invention, the difference consisting only in that the volumetric capacity of the gas holding enclosure is increased by elastically restrained movement of piston 93 rather than distension of elastic sack 30. The form of Fig. 7 has the advantage that the degree of opposition to expansion of the compensating chamber can easily be regulated by adjusting the normal compression of spring 95, this being accomplished simply by rotating stud 97 and thereby shifting the position of rearward spring seat 96 in a direction longitudinally of the cylinder.

Fig. 8 shows schematically a further modification which is illustrative of the use of a single compensating chamber for a plurality of cushions, and also of modified means for preserving the normal differential of internal and external pressures. The system of Fig. 8 is of a dual nature, being in reality illustrative of two types of automatic means for maintaining the normal pressure differential approximately constant. Thus the system may be operated to pump the gas in reverse directions between the cushions and a gas reservoir or accumulator, under automatic control of means responsive to variations in in the differential of pressure internally and externally of the cushions, in such a manner as to preserve said differential approximately constant. Or, by making certain changes, the system may be operated, again under the control of means responsive to the differential of pressures internally and externally of the cushions, to discharge air from the cushions to atmosphere when the pressure differential increases above a predetermined value, and to take air from atmosphere and pump it into the cushions when the differential again decreases, all in a manner to hold the pressure differential approximately constant.

In Fig. 8, numeral 100 indicates pneumatic cushions, which for example may be of the type previously described.

It may here be noted that while Fig. 8 shows but two cushions 100, the system is of course intended to operate in conjunction with as many cushions as there may be in use in the aircraft. Communicating with the interior of these cushions 100 are connections 101 joining with a main gas conduit 102, the latter leading to one side of a reversible pump or compressor 104, driven by a reversible electric motor 105. Pump 104 is of any suitable type closing off against reverse air flow therethrough when its operation is interrupted. The other side of pump 104 receives gas from a line 105a leading from a reservoir or accumulator 106, or from an intake connection 108 opening to atmosphere, depending upon the position of a three-way valve 107. When valve 107 is in position to connect line 105 with the pump, intake 108 is of course closed, and vice versa.

Joining with line 102 is a connection 110 leading to the pressure side of a conventional type of diaphragm chamber 111, and it will be understood that the diaphragm 112 of this chamber is therefore exposed at all times to internal cushion pressure. The opposite side of diaphragm 112 is exposed to external air pressure. Diaphragm 112 is supported against internal pressure by a spring 113. Connected to the diaphragm is a shaft 114, carrying a switch operating member 115, which, under conditions of "normal pressure differential," stands midway between a pair of switches $S_1$ and $S_2$. When the pressure differential increases above "normal," diaphragm 112 moves against spring 113 and carries switch operating member 115 in a direction to close switch head $S_1$, and when the pressure differential decreases below "normal," diaphragm 112 moves in the reverse direction until switch operating member 115 closes a second switch $S_2$.

Assuming control switch $S_3$ to be closed and a control switch $S_4$ to be open, with valve 107 in position to connect reservoir 106 to pump 104, closure of switch $S_1$ resulting from increase in the pressure differential internally and externally of the cushion, in the manner described above, closes a circuit energizing motor 105 through leads 120 and 121, the circuit including a battery or source of electrical energy S. This causes motor 105 to drive in such direction as to operate pump 104 to pump air or other gas from cushions 100 by way of line 102 to reservoir 106. This operation results in decreasing the pressure differential internally and externally of the cushions, and diaphragm 112 accordingly returns to its original position, withdrawing switch operating member 115 from switch $S_1$. The latter thus opens, interrupting operation of motor 105, and the system is again in equilibrium with the pressure differential internally and externally of the cushions again approximately at normal value. On the other hand, when the pressure differential decreases below normal value, diaphragm 112 moves switch operating member 115 in a manner to close switch $S_2$. This results in closing an energizing circuit to motor 105 through lead 121 and a third lead 122, and the motor is so wired and arranged that under such conditions it rotates in the reverse direction, and therefore drives pump 104 to pump air or gas from reservoir 106 back to cushions 100. When the normal pressure differential is again substantially restored, diaphragm 112 will have moved back to a position permitting switch S₂ to open, thus stopping the motor driving the pump. The system as described automatically controls the quantity of air present in the cushions, so as to preserve within close limits the normal pressure differential for appropriate cushion softness.

The system of Fig. 8 is operable in a variational manner by opening switch S₃ and closing switch S₄, and also moving three-way valve 107 to connect pump 104 to atmosphere. With the system in this condition, closing of switch S₁ by diaphragm operated member 115 with increase in the pressure differential above normal completes an energizing circuit, including source of electrical current S, to a solenoid 130, the latter thereupon operating a valve 131 to bleed air from the cushion system, valve 131 being shown connected into line 102, and as having an air discharge outlet 132. The details of valve 131 need not be illustrated, as this valve may constitute any well known type of solenoid operated air valve. When the normal pressure differential is again restored, switch S₁ will again be open, and solenoid 130, then deenergized, holds valve 131 in closed position.

Now when the differential of internal and external pressure decreases below normal value, diaphragm 112 moves to close switch S₂. This results in forming an electrical circuit energizing motor 105 to drive in such direction as to operate air pump 104 to pump air from atmosphere by way of line 102 to the cushions, the air being taken in through intake 108 of three-way valve 107. The resulting increase in the pressure differential moves diaphragm 112 back to its normal position, permitting switch S₂ to open, which deenergizes motor 105 and stops the air pump.

The system of Fig. 8 operated in this manner thus automatically bleeds air from the system when the differential of internal and external pressures exceeds its normal value by a predetermined amount, so as to restore approximately the normal value, and pumps air back into the cushions when the pressure differential falls, again automatically restoring the normal pressure differential.

It will be understood that the drawings are to be considered as illustrative of rather than restrictive on the invention, and that various changes in design, structure and arrangement may be made without departing from the spirit and scope of the invention or of the appended claims.

I claim:

1. A pneumatic cushion comprising a flexible cushion casing adapted to be gas-inflated, said cushion casing including spaced parallel tubular sections, tubular portions connecting opposite ends of said parallel tubular sections, and a compensating chamber communicating with the interior of said cushion casing comprising an elastic sack contained in the space between said parallel, tubular cushion casing sections.

2. In combination with a seat cushion adapted to support a normal passenger load with a predetermined internal pressure differential over the surrounding atmospheric pressure, a control element having a movable wall exposed on one side to internal cushion pressure and on the other side to atmospheric pressure, said wall being loaded against internal cushion pressure, and being movable with changes in atmospheric pressure, and means controlled by movement of the wall of said control element for decreasing the internal cushion pressure with decreasing atmospheric pressure.

3. A pneumatic seat cushion system including at least one pneumatic cushion casing adapted to support a normal passenger load with a predetermined internal pressure differential over the surrounding atmospheric pressure, a control element having a movable wall exposed on one side to internal cushion system pressure and on the other side to atmospheric pressure, said wall being movable with changes in atmospheric pressure, and means controlled by movement of said wall for varying the internal cushion system pressure in consonance with atmospheric pressure by varying the quantity of air contained within said cushion system.

4. A pneumatic cushion comprising a flexible cushion casing comprising a grille work of pneumatic tubes and including a plurality of transversely spaced parallel longitudinal tubes and a pair of transverse tubes connecting opposite ends of said longitudinal tubes, and compensating chambers communicating with the interior of said cushion casing comprising elastic sacks positioned in the spaces between the longitudinal tubes.

5. In a pneumatic cushion for aircraft adapted to be self-compensating for varying flight altitudes while loaded with a given passenger weight, a flexible cushion casing adapted to be gas inflated, and a compensating chamber communicating with said casing and embodying an elastic, distensible wall, said wall having such inherent resistance to distension as to be only slightly, if any, distended beyond its condition under normal inflation of the cushion at ground level when the cushion assumes said given passenger weight at ground level, but having such yieldability and capacity as enables distension to occur, after said given passenger weight has been assumed, throughout a substantial expansion range in accordance with the fall in external pressure incident to aircraft flight altitudes above ground level whereby pressure within the cushion is progressively relieved as altitude is attained.

6. In a pneumatic cushion for aircraft adapted to be self-compensating for varying flight altitudes while loaded with a given passenger weight, a flexible cushion casing adapted to be gas inflated, and a compensating chamber communicating with said casing and embodying an elastic, distensible sack, said sack having such inherent resistance to distension as to be only slightly, if any, distended beyond its condition under normal inflation of the cushion at ground level when the cushion assumes said given passenger weight at ground level, but having such yieldability and capacity as enables distension to occur, after said given passenger weight has been assumed, throughout a substantial expansion range in accordance with the fall in external pressure incident to aircraft flight altitudes above ground level whereby pressure within the cushion is progressively relieved as altitude is attained.

7. In a pneumatic cushion for aircraft adapted to be self-compensating to substantially maintain a predetermined internal pressure differential over external air pressure for varying flight altitudes while loaded with a given passenger weight, a flexible cushion casing adapted to be gas inflated, and pressure compensating means associated with said casing responsive to external air pressure and operative selectively in response to pressure differentials higher than said predetermined pressure differential caused by said given passenger weight to lower the internal cushion pressure in accordance with lowered external air pressure throughout a normal altitude range of aircraft flight.

8. In a pneumatic cushion for aircraft adapted to be self-compensating to substantially maintain a predetermined internal pressure differential over external air pressure for varying flight altitudes while loaded with a passenger weight within a given passenger weight range, a flexible cushion casing adapted to be gas inflated, and pressure compensating means associated with said casing substantially inoperative in response to pressure differentials within the given range of passenger weights but operative under control of external air pressure in response to increase in pressure differential to a higher range caused by lowered external air pressure to lower the internal pressure in accordance with the lowered external pressure throughout a normal altitude range of aircraft flight.

9. In a pneumatic cushion for aircraft adapted to be self-compensating to substantially maintain a predetermined internal pressure differential over external air pressure for varying flight altitudes while loaded with a given passenger weight, a flexible cushion casing adapted to be gas inflated, and pressure compensating means associated with said casing embodying an expansive wall, subjected on one side to the internal load carrying pressure and on the outside to external air pressure, said expansive wall being loaded against expansion caused by increase of internal pressure substantially up to the pressure caused by imposition of the given passenger weight, and being progressively expansive by virtue of and with decrease in external air pressure when the cushion has assumed the given passenger weight, and by such expansion causing decrease in the internal load carrying pressure consonant with external pressure decrease throughout a normal altitude range of aircraft flight.

MARSHALL L. BREWSTER.